United States Patent [19]

Urquhart et al.

[11] Patent Number: 4,772,374

[45] Date of Patent: Sep. 20, 1988

[54] ELECTRODEPOSITION SYSTEM AND METHOD THEREFOR

[75] Inventors: Thomas N. Urquhart, Troy; Gordon T. Urquhart, Southfield, both of Mich.

[73] Assignee: Prime-Coat Technology, Inc., St. Louis, Mo.

[21] Appl. No.: 900,271

[22] Filed: Aug. 26, 1986

Related U.S. Application Data

[63] Continuation of Ser. No. 551,564, Nov. 14, 1983, abandoned.

[51] Int. Cl.[4] .................. C25D 13/14; C25D 17/02; B65G 47/22; B66C 17/06
[52] U.S. Cl. .................. 204/300 EC; 204/299 EC; 204/198; 204/222; 118/409; 118/416; 118/423; 118/425; 134/76; 134/77; 134/157; 134/158; 198/346.3; 212/210; 212/220; 212/221
[58] Field of Search ............ 204/299 EC, 300 EC, 204/180.2, 180.3, 180.5, 180.6, 180.7, 180.8, 181.1, 181.2, 198, 199, 200, 201, 202, 203, 204, 205; 118/425, 416, 409; 212/212, 220, 221; 198/346.3, 478.1, 474.1

[56] References Cited

U.S. PATENT DOCUMENTS

| | | | |
|---|---|---|---|
| 2,598,201 | 5/1952 | Williams et al. | 118/304 |
| 2,960,962 | 11/1960 | Pelavin | 118/425 X |
| 3,089,725 | 5/1963 | Bertels | 414/419 X |
| 3,099,275 | 7/1963 | Pianowski | 204/213 X |
| 3,335,839 | 8/1967 | Neumann | 198/346.3 X |
| 3,388,052 | 6/1968 | Igras et al. | 204/198 |
| 3,399,128 | 8/1968 | Brewer et al. | 204/181 R |
| 3,873,435 | 3/1975 | Ziebarth et al. | 204/222 |
| 4,063,634 | 12/1977 | Perry | 198/802 |
| 4,196,023 | 4/1980 | Rowe | 204/181 R |
| 4,252,229 | 2/1981 | Corbett | 118/425 |
| 4,268,206 | 5/1981 | Johnson | 198/342 |
| 4,377,986 | 3/1983 | Juve | 118/425 |
| 4,402,765 | 9/1983 | Goto et al. | 118/423 |

FOREIGN PATENT DOCUMENTS

4531554 10/1970 Japan .
1395383 5/1975 United Kingdom ......... 204/300 EC

OTHER PUBLICATIONS

*Process Automation and Technology,* Process Automation and Technology Inc., Troy, Mich. (1981).
*Process Beam System,* Process Automation and Technology Inc., Sterling Height, Mich. (1981).
Appenzeller, H. A. et al, "Automated Transport and Handling System for the Processing of Parts Through a Manufacturing Line", *IBM Technical Disclosure Bulletin,* vol. 23, No. 6, Nov. 1980, pp. 2278–2283.

*Primary Examiner*—John F. Niebling
*Assistant Examiner*—John S. Starsiak, Jr.
*Attorney, Agent, or Firm*—Rogers, Howell, Moore & Haferkamp

[57] ABSTRACT

A work processing system comprising: a plurality of work processing stations or tanks arranged in a predefined manner; superstructure means suspended above the process stations; a programmable controller situated remote from said processing stations for generating command signals; crane means suspended on and translatable relative to the superstructure and to the processing stations in response to said command signals; work carrier means carried by the crane means and adapted to be suspended and supported by a respective one of the processing stations; the work carrier unit comprising a work carrier member or platform adapted to support a workpiece and further including means for rotating the work carrier member or platform about a predetermined axis thereof in response to command signals.

25 Claims, 7 Drawing Sheets

ELECTRODEPOSITION SYSTEM AND METHOD THEREFOR

This application is a continuation of application Ser. No. 551,564 filed 11/14/83, now abandoned.

BACKGROUND AND SUMMARY OF THE INVENTION

This invention relates to electrodeposition and coating systems for workpieces and more particularly to a unique and novel electrodeposition system utilizing a programmable hoist having an oscillating workpiece platform.

The present invention is best understood in the context of an electrodeposition or electropainting system wherein corrosive resistant coatings are applied to a workpiece such as a car body. It should be understood that the invention described below is not limited to car body applications and is applicable to any procedure for treating unfinished metal, especially where the geometry of the workpiece tends to entrap air and is not easily drained.

Prior to applying a finish coat of paint to a workpiece such as a car body, it has been necessary and desirable to apply corrosive resistant finishes to the workpiece under and over surfaces. One method of applying this finish is to use an electrodeposition or electropainting system. Prior electrodeposition or electropainting systems have utilized a series of extremely long and narrow immersion tanks with a monorail installed thereabove. Workpieces or car bodies are attached by carriers to the monorail and moved into and through the fluid within each immersion tank. A fluid, such as a pre-rinse, phosphating or electropainting solution is applied to the car body (workpiece) by virtue of the forward progression of the body within each tank. In addition to immersion tanks these systems may include a variety of spray booths for rinsing the body and heating or baking ovens for drying the finish. In such a system it has not been possible to apply a uniform protective coating to the various surfaces of the car body especially the car body undersurfaces where air is trapped. A further deficiency in these prior systems is that as the body is lifted from an immersion tank, a certain amount of fluid is retained in the cavities of the car body. As the car body is lifted from one tank and moved to another tank, this fluid is often carried into the adjacent tank contaminating the fluid therein or disturbing the process performed therein. Further these prior systems utilize large amounts of power since the bodies are wetted by virtue of their powered continuous motion through the various immersion tanks. In addition entrapped fluid may tend to cause the car body to float. Some additional considerations regarding these prior systems may be found in the document entitled "Recommended Design Considerations for the Use of PPG Electrodeposition Coatings" by PPG Industries, Inc., Springdale, Pa.

In contrast, the present invention comprises a system which minimizes drag-out of fluid, permits a uniform protective and sufficiently heavy coating of paint or material to be applied to the under and over surfaces of the workpiece. In addition, the system is flexible in design to accommodate a number of various physical arrangements. Accordingly, the present invention comprises:

A work processing system comprising: a plurality of work processing stations arranged in a predetermined sequence. These stations may include spray and immersion tanks, post rinse tanks, an electropainting tank and baking oven cells. The system further includes superstructure means suspended above the process stations, a programmable controller situated remote from the processing stations for generating command signals. A crane is suspended on and translatable relative to the superstructure and to the processing stations in response to the command signals. The system includes a work carrier unit carried by the crane and adapted to be suspended and supported by particular processing stations after insertion thereon. The crane further includes means for engaging and lifting and lowering the work carrier unit into and out of a respective one of the processing stations in response to control signals generated by the programmable controller. The work carrier unit comprises a work carrier member or platform adapted to support a workpiece and further includes means for rotating the work carrier member, platform, or workpiece about a predetermined axis thereof in response to command signals.

The system may further include sensors for monitoring the conditions within each processing station. The sensors transmit signals to the controller for storage and use by the controller.

Uniformity of paint application and reduced power requirements are achieved by the present invention by virtue of the fact that the workpiece can be lowered within an electropainting process station, tank, or cell and oscillated back and forth to remove entrapped air prior to applying power to the electrodes associated with the electropainting process station.

DETAILED DESCRIPTION OF THE DRAWINGS

Figure 1:
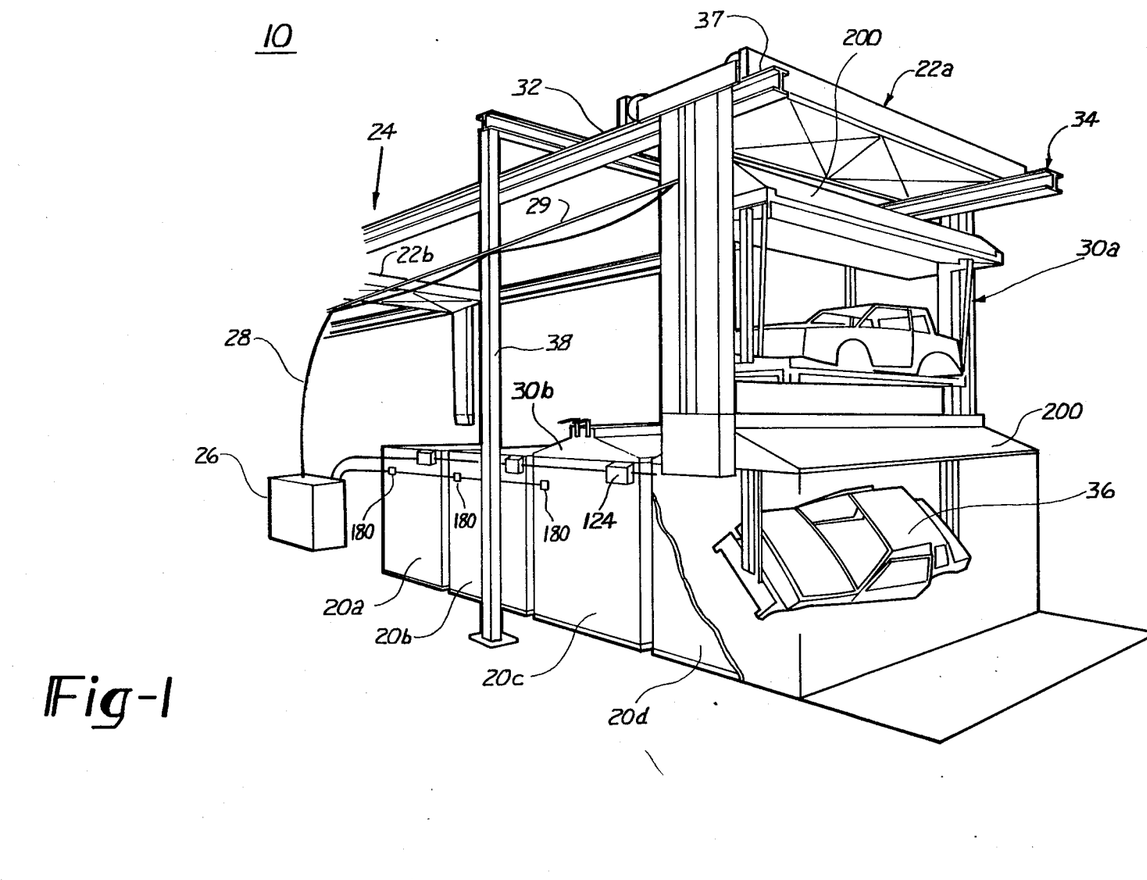
FIG. 1 illustrates a multistation electropainting system.

Reference is made to FIG. 1 which illustrates a system 10 for applying to a workpiece, such as a car body, corrosive resistant finishes. More particularly there is illustrated an electropainting system 10 which comprises a plurality of process stations generally designated as 20. These process stations, such as containers, cells or tanks 20, may include a prerinse or cleaning station 20a, a postrinse station 20b, a heating unit or oven 20c and an electrodeposition unit 20d.

The system 10 comprises at least one movable crane generally designated 22 (22a, 22b) supported by a superstructure 24. Each crane 22 is adapted to carry move, lift and transport a work carrier unit 30 (30a, 30b) which carries with it a workpiece 36, such as a car body, through the various process stations 20 of the system 10.

As an example, FIG. 1 shows one such system comprising two cranes 22a and b and two work carrier units 30a and b. While only two cranes are illustrated, the system may accommodate any number of cranes and work carrier units. Crane 22b is only partially illustrated. Once a particular work carrier unit 30 is positioned over a desired process station 20, by its associated crane 22, the crane is controlled to move, lift and/or insert the work carrier unit 30 and workpiece 36 into the particular one of the process stations 20. In this manner the crane 22 is controlled to engage, carry and place a respective work carrier unit 30 into and out of the various process tanks in a predetermined sequence to permit various coatings to be properly applied and cured to the workpiece 36.

After a particular work carrier unit 30 is positioned within a particular process station 20, the crane 22 may be commanded to move to another station 20, such as tank 20c, to remove, lift or insert another work carrier unit 30 therein while the workpiece 36 on the above mentioned work carrier unit 30 is processed in the aforementioned station or tank 20 such as 20d.

FIG. 1 also illustrates a work carrier 30a in both its elevated and immersed positions relative to tank 20d. The remaining work carrier unit 30b is shown in its lower or immersed position within process station 20c. The second crane 22b is shown remote from the process stations, presumably loading or unloading another workpiece onto or off its work carrier unit. As illustrated in FIG. 1, each work carrier unit comprises a work lid 200 which, when in its lowered position, engages and completely covers a particular process station (tank or cell) 20. The number, location, arrangement and specific type of process stations 20 may vary with the specific application of the system. In the preferred embodiment of the invention, such as an electrodeposition system, the rinse station 20a and postrinse station 20b may include tanks filled with cleansing or rinsing fluids such as deionized water, permeate or zinc phosphate. Alternatively this station may include reciprocating spray heads to spray these fluids, under pressure, at a workpiece to provide impingement spray in both the horizontal and vertical planes as described in greater detail in conjunction with FIG. 10. The heating oven may include convection and/or infrared oven cells (see FIGS. 11-12). The workpiece may also be oscillated while it is within an oven cell. The oscillation advantageously exposes more surface area of the workpiece to the heating elements. In addition, as discussed in greater detail below, these top loading oven cells allow for multiple curing and cooling procedures to be performed therein. The electrodeposition unit may include an electrodeposition solution, electrodes and associated power supply of a known variety.

Power and control signals are transmitted from a process controller 26 through a plurality of umbilical cords or cables 28 to each crane 22 and/or tank 20. As an example these cables 28 can be located in a track 29 or directly supported by the superstructure 24. It should be understood that each process station 20 and crane 22 requires separate power and control signals; however, only one such exemplary cable is shown. The controller 26, mentioned above, is preferably situated in a quiet environment, remote from the work or process stations 20.

With reference to FIG. 1, the superstructure 24 comprises a pair of parallel situated, elevated supports 32 and 34 suspended by vertical members 38.

Each horizontal support (32, 34) may comprise an I-beam. A rail 39, such as an ASCE rail, may be mounted to a horizontal surface 37 of each horizontal support 32 or 34. The rail 39 is shown in greater detail in FIG. 2. Each of the cranes 22 is suspended on and translates on the rails 39 as described in greater detail below.

Figure 2:
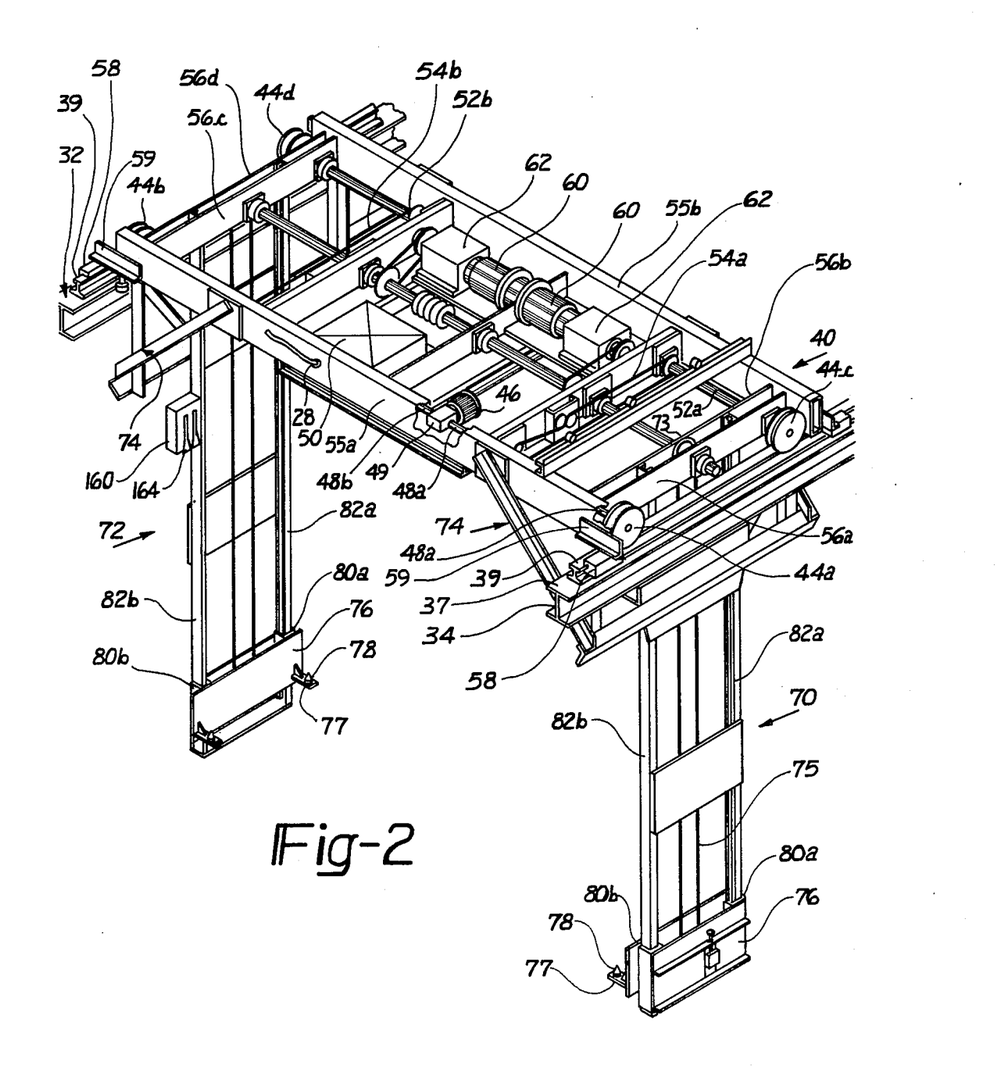
FIG. 2 illustrates a perspective view of a crane.

Reference is now made to FIG. 2. Each crane 22 comprises a substantially rectangular upper member or hoist cart 40 which extends between and is supported by the rails or tracks 39 of the superstructure 24. As previously mentioned each track 39 is positioned upon the flat portion 37 of the supports 32 and 34. It should be appreciated, however, that the hoist cart 40 can be supported by and suspended from only one horizontal support (32, 34) for smaller load conditions. The hoist cart 40 preferably includes a plurality of powered, tracked wheels or rollers 44 (44a-d) that translate on the rails 39. A first pair of wheels, designated as 44a and b, is connected through a transfer motor 46, shafts 48a and b and gear box 49. The connection of the shafts 48 to the gear box 49 and to the wheels 44 are shown in the cutaways provided in FIG. 2. Power is distributed to the transfer motor 46 from a cord 28 through a junction box 50. Only a portion of the cord 2 is shown. A second set of tracked wheels, designated 44c and d, are powered by shafts 52a and b and drive units 54a and b such as gear or belt drives of a known variety connected to shafts 48a and b. It should be appreciated that more than one transfer motor 46 may be used either for load sharing purposes or to improve the reliability of the system.

Each hoist cart 40 further includes transverse members 55a and b which extend across the supports 32 and 34. Support members 56a-d connect members 55a and b together and further support various elements of the hoist 40 such as the wheels 44, shafts 48 and 52 and drive units 54. Alignment of the wheels 44 is further enhanced by plastic bearings 58 which are secured to the plates 59 and mounted to the members 55. Roller or cam following guides may be substituted for the plastic bearings 58.

The hoist cart 40 further includes at least one lift motor 60, although two such motors are shown in FIG. 2, such as a two-speed electric motor and corresponding gear reduction units 62 which power elements of two vertical hoist masts 70, 72. Power to the lift motor 60 is transmitted via the junction box 50 which in turn receives its power from one of the cables 28. Power is also provided to a power distribution means 160 which provides a means for supplying power to a work carrier unit 30 when it is in an elevated position. The details of this power distribution means are discussed in conjunction with FIGS. 7 and 8.

The vertical hoist masts 70, 72 extend vertically downward from the support members 56 of the hoist cart 40 and are supported by appropriate bracings 74. Each hoist mast 70, 72 contains a pickup carriage 76 supporting a pair of inwardly extending flanged member 77. Each pickup carriage is powered by a drive, such as a sprocket drive 75, which includes a chain sprocket 73, in response to the motion of the lift motors 60. Each member 77 supports a shock absorbing mount 78 extending therefrom. Each carrier 76 further includes a pair of plastic bearings 80a and b which engage and slide upon the vertically extending rails 82a and b. The vertical position of each hoist mast is controlled by motor 60 in response to signals transmitted from the controller 26. The inwardly extending flange members 77 are designed, as hereinafter described, to engage and lift a coacting part of the work carrier unit 30.

Figures 3, 6, 10:
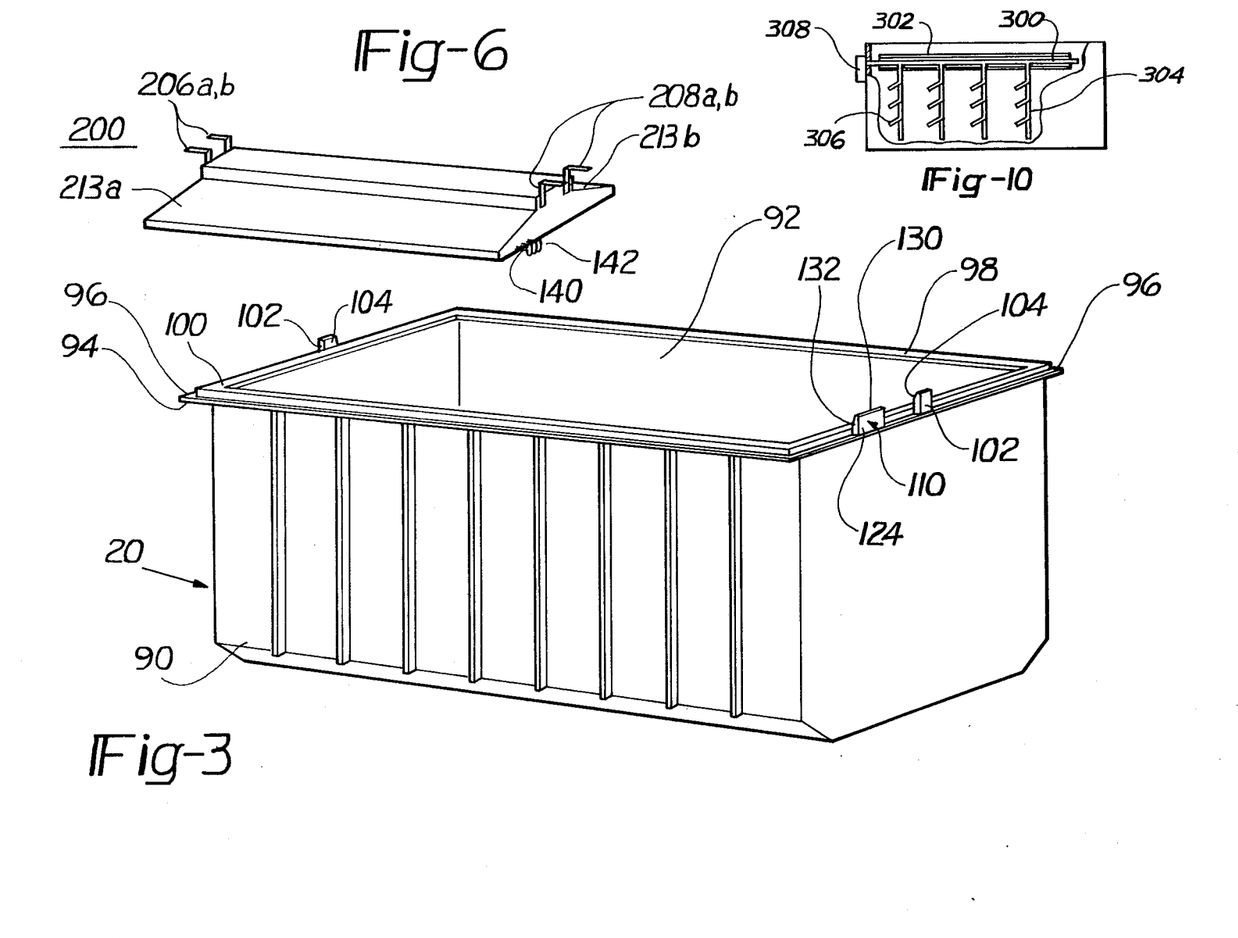
FIG. 3 illustrates a perspective view of a work process station.
FIG. 6 illustrates a perspective view of the roof of a work carrier unit.
FIG. 10 is a cross-section of a spray-clean process station.

Reference is now made to FIG. 3 which illustrates a perspective view of a typical cell, tank or process station 20. The tank 20 is substantially rectangular, and may include a truncated bottom 90 to give the tank a somewhat conical shape. The truncated bottom 90 is useful in enhancing the circulation of fluid within an appropriate tank 20 and for providing structural support. Surrounding the open end 92 of tank 20 is a tank rim 94 which provides a flat mounting surface 96 to receive a support cradle 98. The cradle 98 functions to receive and locate the work carrier 30 as the work carrier is lowered by the hoist masts 70 and 72. More particularly, the support cradle 98 comprises a rectangular frame which is supported by the tank rim 94 and surrounds the open end 92 of the tank and provides a locating surface 100 upon which a portion of the work carrier 30 rests. A plurality of work lid locators 102 extend upwardly from the locating surface. Each work lid locator 102 includes an inwardly sloping face 104 which serves as a guide to position a work lid 200 or upperdeck 202 of the work carrier 30 as the work carrier is lowered thereon.

The tank 20 further includes means 110 for distributing power and control signals to and from the work carrier 30 while the work carrier is positioned upon the support cradle 98. Such power means 110 includes a power bus comprising conductive bars 120 within a protective enclosure located on and extending up from the support cradle 98 or from the side of the tank 20 and a cooperating power collection arm 140 which rides with and is carried by the work carrier 30. The power means 110 is described in greater detail in conjunction with FIGS. 8 and 9. Each cell or tank 20 can be structurally similar. As an example, an electrodeposition or electropainting cell or tank would include solution, electrodes and power distribution elements similar to that outlind in previously referred to document on electrodeposition coatings by PPG which has been incorporated herein by reference. A typical spray or rinse process station, cell or tank is described in conjunction with FIG. 10. Further, an exemplary oven cell is shown and described relative to FIGS. 11-12.

Figure 4:
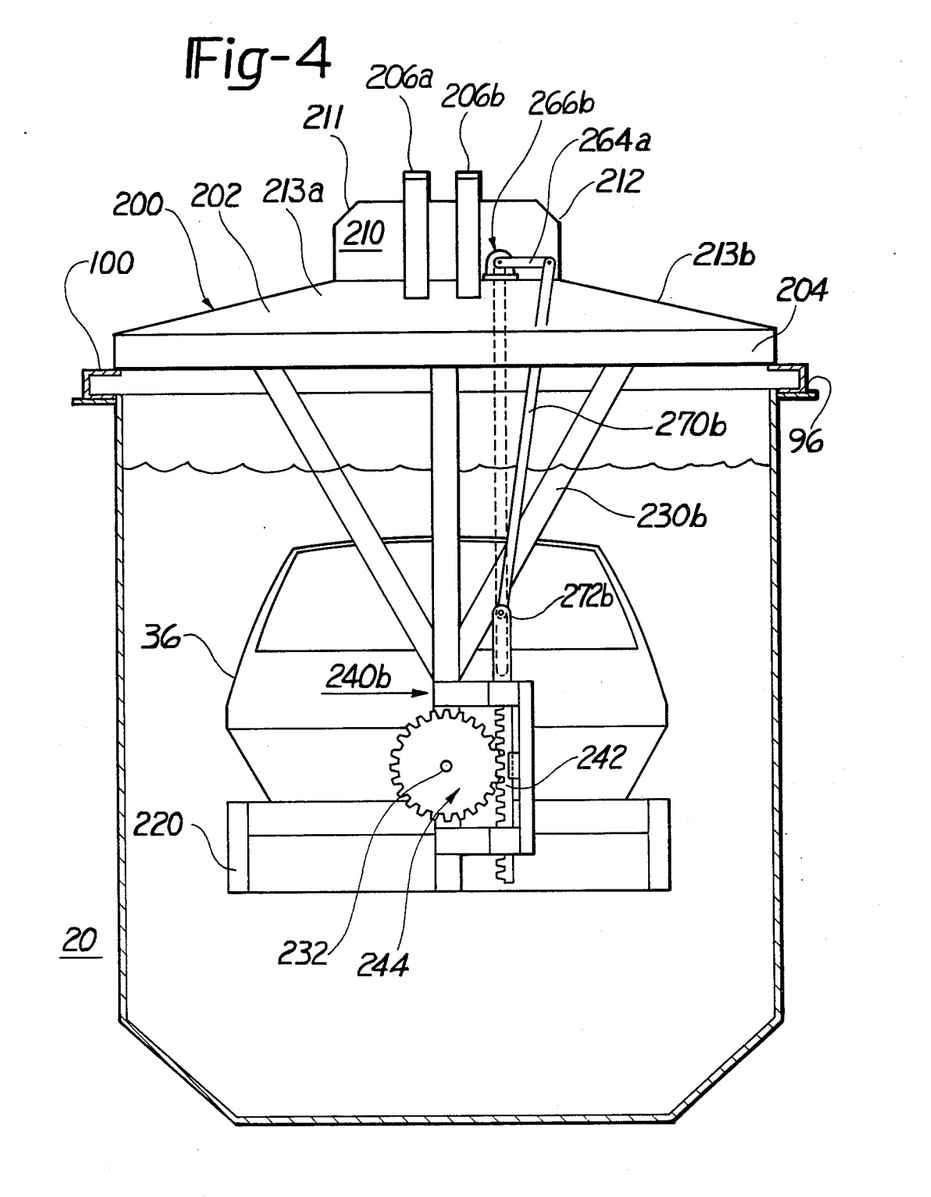
FIG. 4 is an end view of the work carrier unit.

The work carrier unit 30 as shown in the accompanying Figures comprises a work lid 200. The work lid 200 is shown in FIG. 4 and is removed for clarity in FIG. 5. The work lid includes a roof or cover 202. The cover 202 may also house insulating material to permit it to function as an insulated cover for use with a heating or oven process station. FIG. 6 is a perspective view of one such roof or cover 202. The roof 202, as shown in FIGS. 4 and 6, comprises a central peaked portion 210 defining a roof line 211, 212. The roof 202 further includes a pair of lower portions 213a and b which extend laterally outward from the central peaked portion 210 to extend the sloping roof line sufficiently outward to cover an upper deck 204 of the work lid 200. As described below the central peaked portion 210 provides an enclosure for the motor and gear unit shown in FIG. 5. The upper deck 204 supports two pairs of flanged members 206a and b and 208a and b. These flanged members extend outwardly a sufficient length to engage the shock mounts 78 of the hoist masts 70 and 72.

Figure 5:
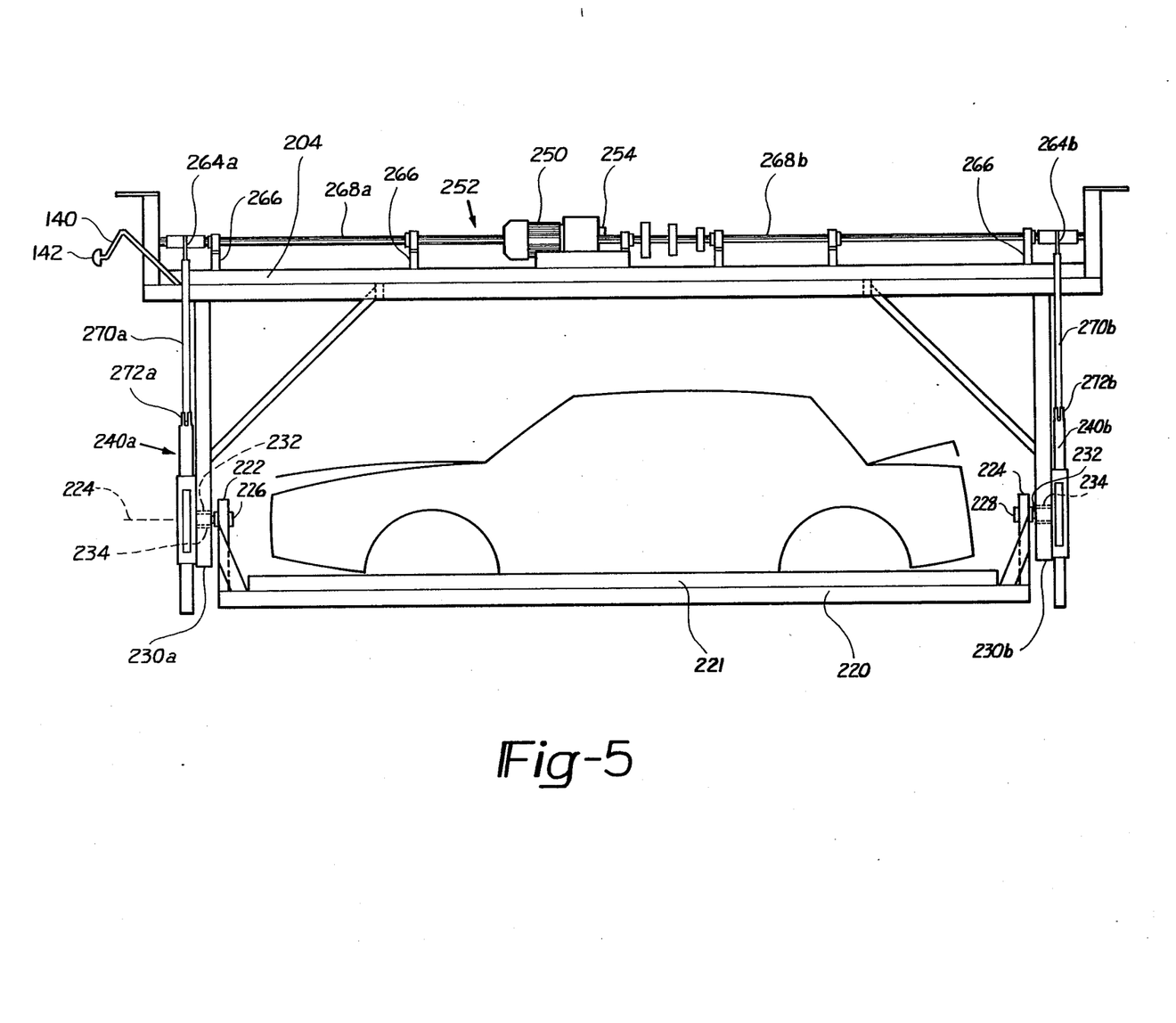
FIG. 5 illustrates a side view of one such work carrier unit immersed in a processing station.

The work carrier unit 30 further includes a work carrier member or platform 220 that is supported at ends 222 and 224 through pivots 226 and 228 by a support structure 230a and b which extends down from the upper deck 204. Each pivot 226 or 228 comprises a shaft 232 extending outwardly from ends of the platform 220 and is supported by a bushing or bearing 234 situated within the support structure 230. In this manner the work carrier member or platform 220 is free to rotate or oscillate about the axis 225. The platform 220 may be used to directly engage and support a workpiece 36 or, as illustrated in FIG. 5, the platform 220 may support a pallet 221 upon which is mounted the workpiece. In operation, the pallet 221, having the workpiece thereon, is loaded onto the platform 220. Means such as a pin or clamp are provided to positively secure the pallet 221 to the platform 220.

An alternate embodiment (not shown) of the invention would utilize a platform 220 fixedly mounted to a support structure 230 and requires that the structure 230 be pivoted at its connection to the work lid. In this manner the platform 220 can be swung in a pendulus manner rather than oscillated as described above.

Each work carrier unit 30 further comprises two spur and rack gear or rack and pinion assemblies. As illustrated, each assembly 240 (240a, b) comprises a rack 242 and a spur gear 244; however, bevel or other type gears may be substituted. Each spur gear 244 is mechanically linked to a respective one of the shafts 232, such that it (the spur gear 244) is rotated by the vertical motion of its respective rack 242 thus causing the platform 220 to rotate or oscillate about the axis in a controlled manner. Each respective rack 242 is supported in a known manner by the support structure 230 for engagement with its associate spur gear.

Each rack 242 is driven by a gear motor 250 through a gear and shaft assembly 252 as shown in FIG. 5. The gear and shaft assembly 252 includes rotational limit switches, generally designated as 254, of a known type, which generate signals for use by the controller 26. These signals indicate that the assembly 252 or the platform 220 has rotated a predetermined clockwise and counterclockwise amount. The gear and shaft assembly 252 further includes drive crank arms 264a and b supported for rotation by respective pivot bearings 266. One end of each drive crank arm 264 is connected to a respective shaft 268a and b which is rotated by the gear motor 250. A second crank arm 270a and b connects the other end of each drive crank arm 264 to a pivot 272 (272a, b) at the upper end of its respective rack 242. A second gear motor may be provided to supply redundancy to the operation of the work carrier unit. The dotted lines in FIG. 4 illustrate a rotated position of the arms 264 and 270. As noted in FIG. 5 the motor 250 and the gear and shaft assembly 252 are supported by the upper deck 204 of the work lid 200.

The roof 202 prevents drainage from other work carrier units 30 passing above a particular carrier unit (in a processing station) from reaching the motor and shaft assemblies and further provides that any moisture which may accumulate on the roof will run off to its outside edges and not drip on the workpiece suspended below. Furthermore, the peaked roof adds structural strength to the work carrier unit 30 without adding appreciable weight.

It is necessary to provide power to rotate the platform 220 of the work carrier unit 30 when the work carrier unit 30 is in either of two positions or conditions. The first condition is defined when the work carrier unit 30 has entered a particular work station 20 and is detached from a hoist cart 40. The second condition is defined when the work carrier unit 30 is in its uppermost position within a hoist cart 40, a position which is achieved after retraction from a process station 20 or during transport to another process station.

Figure 9:
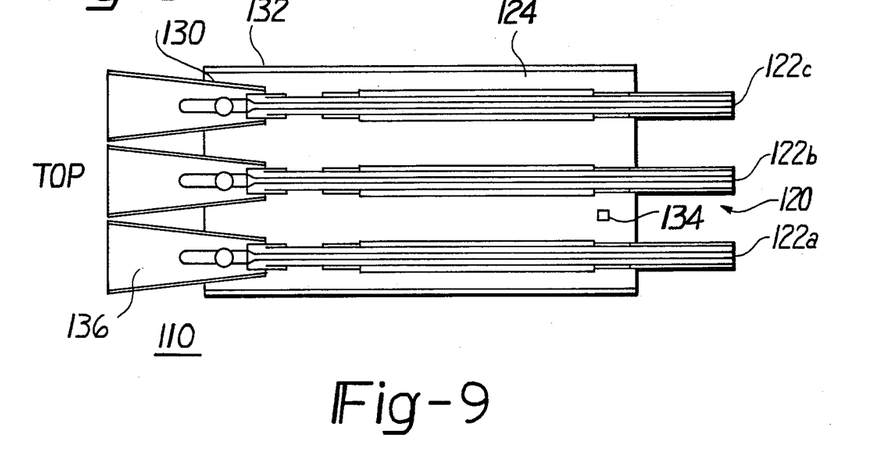

Reference is again made to FIGS. 7–9. FIG. 9 illustrates a power distribution means 110. Such means comprises an electrical bus 120, including conductive bars 122, the number of which correspond to the number of phases of the gear motor 250. The conductive bars 122 distribute power to a work carrier unit 30 when it is lowered or in the first condition. The electrical bus 120 is housed within a protective enclosure 124 shown in FIG. 3. The protective enclosure extends upwardly from the support cradle 98 or wall of the tank 20 and has an open top end 130 and inwardly facing open sides 132. The protective enclosure 124 further supports at least one limit switch generally shown as 134 in FIG. 9 which is activated to generate a signal for use by the controller 26 to indicate the fact that the work carrier unit 30 is in place upon the support cradle 98. Upon receipt of this signal, power is supplied to motor 250 to oscillate the workpiece. The enclosure 124 further supports a plurality of open ended V-shaped guides 136 which are positioned above and apart from, yet adjacent to, a corresponding one of the conductive bars 122.

Figures 7, 8:
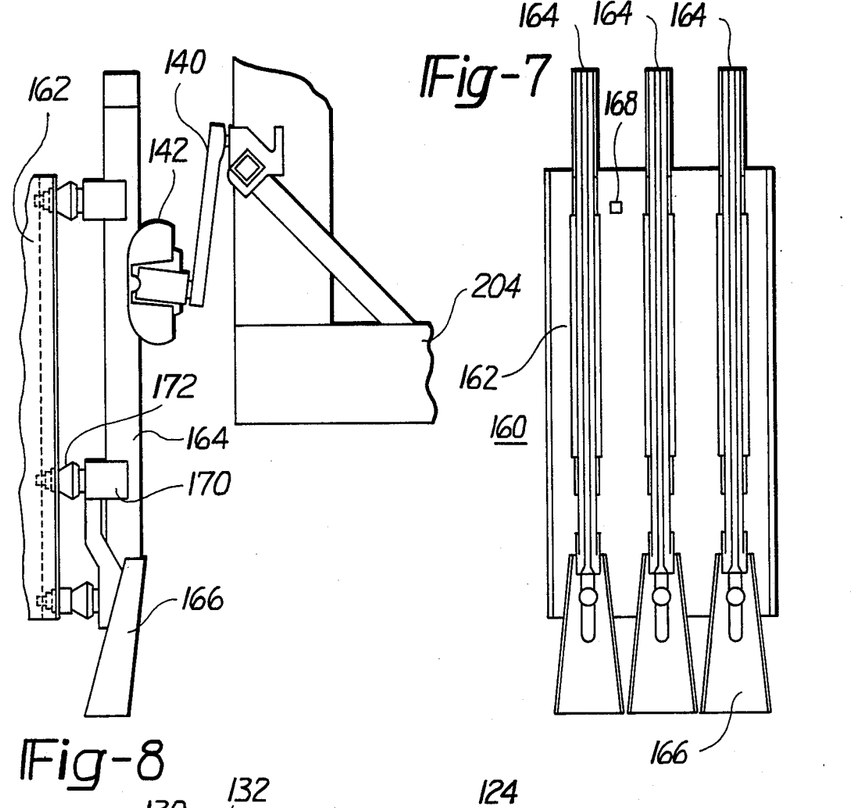
FIGS. 7-9 illustrate a power distribution device.

To enable power to be supplied to the platform 220 when the work carrier 30 is in its second or uppermost position, another power means 160, similar to power means 110, is supported by the hoist cart 40 as illustrated in FIGS. 2, 7 and 8. More particularly the power distribution means 160 comprises a protective enclosure 162, conductive bars 164, V-shaped guides 166 and a limit switch 168. The means 110 and 160 are substantially identical in form and function except that means 160 requires the V-shape guides 166 to be downwardly extending while means 110 requires its corresponding guides 136 to be upwardly extending. FIG. 8 illustrates a side view of the power distribution means 160 showing the connection of a typical conductive bar 164 to its enclosure 162 and the mounting of a V-shaped guide 166 relative thereto by a plurality of hanger clamps 170 and spools 172.

The power means 110 or 160 further includes, on the work carrier unit 30, a plurality of articulated arms 140 extending outwardly from the work lid 200. There is preferably one arm 140 associated with each conductive bar 122 or 164. These articulated arms are also shown in FIGS. 5 and 6. A power collector 142 is mechanically connected to one end of the arm 140, and is electrically connected to the gear motor 250. The power collectors 142 comprise a U-shaped member which may be conductive or which contains a conductive insert therein and sized to positively engage a corresponding one of the conductive bars.

As the work carrier 30 is positioned onto the support cradle 98, each power collector 142 is directed by a corresponding V-guide 136 into electrical engagement with a particular conductive bar 122. In addition as the power collector 142 moves downwardly into engagement with the limit switch 136 the above mentioned signal is generated to indicate the work carrier 30 has achieved the first condition. Power is supplied to the platform 220 upon engagement of the power collector 142 with its corresponding conductive bars 122. In addition the power collector 142 activates the limit switches 136 to generate a signal indicating that the work carrier 30 has achieved its desired position. The power collector 142 will engage the other conductive bars 164 and limit switch 168 in its uppermost position to generate a signal that the carrier unit 30 is positioned correctly.

Reference is briefly made to FIG. 10. This figure illustrates a schematic respresentation of a spray or rinse process station or tank such as station 20a. More specifically, there is illustrated a fluid carrying header 300 mounted to oscillate longitudinally along the length of the tank, parallel to the axis of rotation of the workpiece. The header 300 may be slidably positioned within a guide 302. A plurality of fluid carrying conduits or risers 304 extend from the header 300. At least one spray head 306 is mounted to each conduit 304 for spraying fluid such as a rinsing or cleansing agent therefrom. The header 300 may be articulated by means such as an air cylinder, motor or other device, generally indicated as 308, mounted outside the tank and adapted in a known manner to receive and/or pressurize the fluid to be sprayed. Another set of spray heads, conduits, guides, header and motor may be mounted to the other side of the tank. By combining the oscillatory motion of the spray heads 306 with the effective vertical movement of the workpiece, by virtue of its rotation, yields an improved spray-rinse operation.

Figure 11:
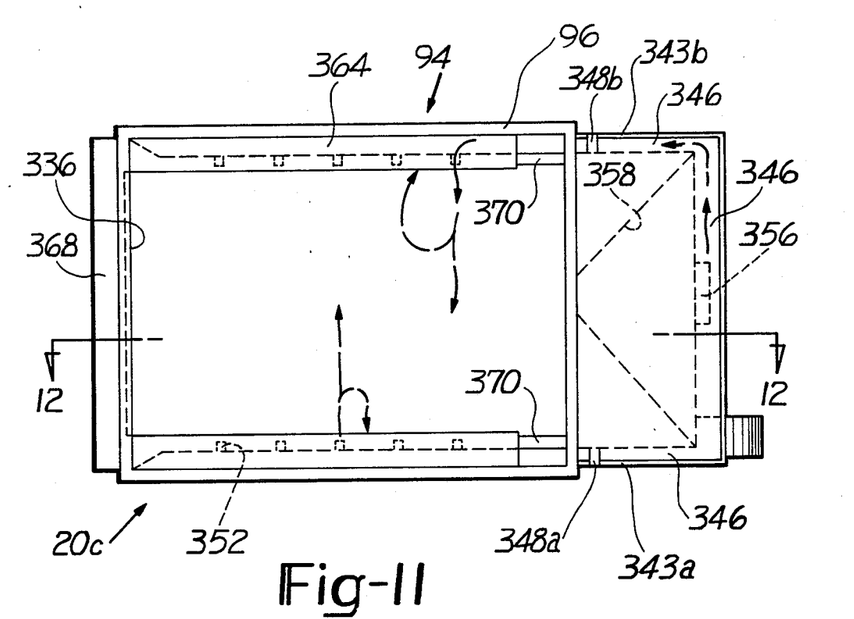
FIGS. 11-12 illustrate an exemplary heating oven or cell.
Figure 12:
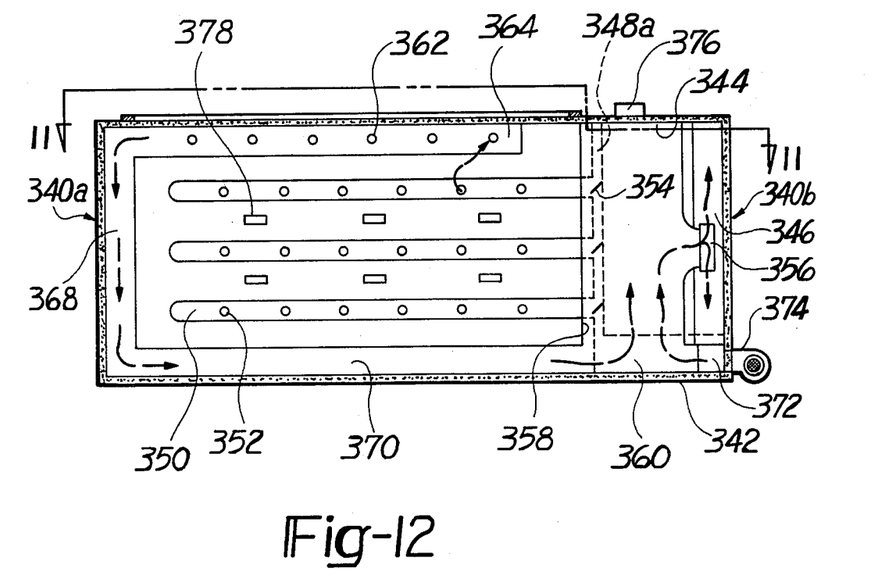

Reference is now made to FIGS. 11–12 which illustrate an exemplary baking (or heating) process station oven or cell generally illustrated as 20c. This process station is generally similar to the tank illustrated in FIG. 3. The heating oven 20c retains a substantially rectangular shape having an open end 336 above the heating cell 338 into which a workpiece is suspended. Inasmuch as the process station 20c is utilized as a heating or baking oven, the ends 340a and b, the bottom 342 and sides 343a and b may be insulated. For the purpose of clarity only the ends and bottoms have been illustrated as being insulated. It will be recognized that the heating oven is somewhat larger than the previously illustrated immersion tank to accommodate the duct work, fans and burner needed to provide heating air. The tank 20c includes, as did the previously described immersion tank, a rim 94 providing a flat mounting surface 96. While not illustrated, the flat mounting surface 96 would receive a support cradle 98 as previously described. The heating cell or oven 20c comprises an insulated heat chamber 344. The heat chamber 344 comprises an input heat duct 346 situated at the extreme right hand portion as shown in FIGS. 11–12. The duct 346 spans the length of the wall 340b and extends laterally along the sides of the heat chamber 344. The input duct 346 terminates at a riser 348 (a and b), one situated on either side of the heat chamber 344. A plurality of headers 350 are positioned on the walls of the heating cell 338 and extend from the riser 348. Each of the headers 350 includes at least one nozzle 352. To assist circulation of air from the riser to each header 350, a deflector 354 may be mounted at the intersection of the riser and appropriate header. A fan 356 is mounted within a conical duct 358 linking a return duct 360 to the inlet duct 346. In this manner air within the return duct is pressurized by the operation of a fan 356 and forced into the inlet duct 346. The air flows through inlet duct 346 and the risers 348 and is distributed through each header 350 and is permitted to exit therefrom through the plurality of nozzles 352. Of course, it should be appreciated that the heating cell is not normally utilized until the workpiece and its insulated roof is seated upon the support craddle 98 (not shown) of the heating cell 20c. In this manner, the volume of the cell 338 forms an enclosed heating chamber to heat treat the car body (workpiece). The heated air (as shown by the solid arrows) after exiting from the nozzles 352 and enveloping the workpiece (not shown) enters the openings 362 in a portion of the return duct 364, one situated on each of the sides of the chamber 338. The return duct 364 further includes a vertical riser section 368 and a horizontal duct section 370. The horizontal duct section 370 terminates in the return duct 360, the bottom of which is connected to a burner 372 and associated blower 374. A portion of the heat and burner fumes within the duct 360 are eliminated therefrom by operation of an exhaust fan 376. In this manner it can be seen that the heating oven provides a continuous forced air recirculation system for heating the workpiece. The combined action of the heat flow exiting the appropriate nozzles 352 in cooperation with the rotational movement of the workpiece results in improved and rapid heat treating of the workpiece.

The heating oven 20c may further include a plurality of infrared or radiant wall panels 378 situated on the sides of chamber 338 and interspersed between the headers 350. These infrared or radiant wall panels 378 may be gas fired or electrically energized. Thus, the convection forced hot air and infrared or radiant wall heating elements of the cell 20c can be operated singly or in combination.

In operation, a particular hoist cart 40 of the system is suspended above a particular process station 20 in response to commands received from the programmable controller 26. The work carrier unit 30, carried by this particular hoist cart 40, is suspended into a particular process station to totally submerge the workpiece into solution, within a heat chamber, or positioned relative to spray heads within a spray booth. Thereafter, the work carrier motor gear 250 is activated. This activation causes the spur and rack gear assemblies 240 to rotate or oscillate the work carrier member or platform 220 about its axis of rotation. Regarding the process of immersing the workpiece or car body within solution, it has been found that by controlling the angle of entry of the body into solution minimizes the effect of bouyancy, reduces the time to submerge the body into solution and permits air (air bubbles) lodged within various body cavities to escape thereby achieving total paint adhesion. Once submerged it has been found that by rotating or oscillating the workpiece through an angle of approximately 75° permits solution to reach each portion of a convoluted workpiece such as a car body. The rotational angle of 75° is referred to merely as an example. This angle can approach plus or minus 180° or a complete 360° rotation. After the workpiece has been oscillated or rotated through a predetermined number of cycles and/or for a predetermined period, the platform 220 is returned to its horizontal position. If a crane 22 is not positioned above the particular work carrier unit 30, one is commanded to do so in response to commands issued by the programmable controller 26. Thereafter, the vertical hoist masts 70, 72 are commanded to move upwardly to engage the flange members 206 and 208 of the work carrier unit 30 to lift the work carrier unit 30 out of the tank and suspend it above the particular processing station. After the power collector 142 engages the conductive bars 164, the platform 220 is again oscillated to induce excess fluid to drip from the workpiece and also from submersed parts of the work carrier unit 30 and reenter the tank. Thereafter the crane 22 is typically controlled to move the work carrier unit 30 and associated workpiece 36 to another process station.

While a particular work carrier unit 30 is placed within a corresponding process station 20, one of the cranes 22 may be programmed to remain stationary or, alternatively, may be programmed to move to another work processing station to remove a different work carrier unit 30 therefrom and insert it into another process station. Thereafter, the hoist carrier 40 would return to remove the above described work carrier 30 from its process station 20 and to thereafter position it above and then into still another work processing station 20.

The operation within a spray tank, such as that illustrated in FIG. 10, illustrates further advantages of the present invention. In operation the platform 220 is oscillated in a manner as discussed above. During this oscillatory motion the spray heads 300 are translated laterally, parallel to the axis of oscillation and parallel to the sides of the workpiece. This combined oscillatory and translational motion exposes the entire inner and outer members of the body to the high pressure forces of the fluid emanating from the spray heads, resulting in total wetting and improved cleaning and rinsing of the workpiece.

The system 10 may further include sensors 180 which communicate with the controller 26 to monitor the various operating conditions within each work station 20 as a particular workpiece 36 is processed. These operating conditions such as: temperature, elapsed time within a work station, fluid conductivity, power utilization, pH of the solution, etc., can be stored by the controller 26 for later recall and analysis, thereby providing a means of correlating the quality of the finished workpiece with objective parameters indicative of the operating conditions. In addition, these operating conditions may be used as feedback parameters to indicate changes from nominal in the process conditions and used to vary the duration the workpiece remains within each processing station.

Many changes and modifications in the above described embodiment of the invention can of course be carried out without departing from the scope thereof. Accordingly, that scope is intended to be limited only by the scope of the appended claims.

Having thus described the invention, what is claimed is:

1. In a deposition system for applying a coating to workpieces such as, for example, car bodies, and where said system includes a plurality of sequentially disposed process tanks into which the workpieces are placed, apparatus for transporting said workpieces from one process tank to another and for lowering and lifting said workpieces into and out of said tanks, said apparatus comprising:
   (a) a superstructure over said tanks;
   (b) at least one crane supported by said superstructure;
   (c) drive means for translating said crane along said superstructure;
   (d) at least one work carrier unit having means for supporting at least one workpiece, said crane having means for engaging and supporting said work carrier unit;
   (e) selected ones of said tanks having means for supporting said work carrier unit and workpiece supported thereby;

(f) a motor drive carried by said work carrier unit for rotating said workpiece supported thereby, said motor drive further comprising a motor and drive train;

(g) means for supplying power to said motor for rotating said workpiece in a selected tank; and (h) means for supplying power to said motor for rotating said workpiece above said selected tank;

(i) whereby the work carrier unit and workpiece are transported from one tank to another and lowered and lifted into and out of selected ones of said tanks, and said work carrier unit may be rotated in and above a selected tank.

2. The apparatus of claim 1 wherein said drive means carried by said work carrier unit further comprises means for rotatably oscillating said workpiece in said selected tank.

3. The apparatus of claim 2 wherein said drive means carried by said work carrier unit further comprises means for rotatably oscillating said workpiece above a selected tank.

4. The apparatus of claim 1 further comprising means for disengaging said crane from said work carrier unit, whereby said crane is free from said work carrier unit when said work carrier unit is supported by a tank to translate along said superstructure for engagement with another work carrier unit.

5. The apparatus of claim 1 wherein said crane further comprises a carriage engageable with said work carrier unit for lowering and lifting said work carrier unit into and out of said tanks.

6. The apparatus of claim 5 wherein said superstructure further comprises horizontally spaced parallel rails, said crane being supported by said rails for translation therealong and having depending hoist masts, said hoist masts having means for supporting said carriage, and drive means for lowering and raising said carriage relative to said hoist masts, whereby said work carrier unit is engageable by said carriage to support said work carrier unit between said hoist masts when transported by said crane.

7. The apparatus of claim 1 wherein said work carrier unit further comprises a platform for supporting said workpiece, said drive means carried by said work carrier unit rotatably oscillating said platform and workpiece as a unit.

8. The apparatus of claim 2 wherein said platform is rotated about generally horizontal axes.

9. The apparatus of claim 1 wherein said workpiece is rotated about generally horizontal axes.

10. The apparatus of claim 1 wherein said motor for rotating said workpiece is electrically powered, and further comprising electrical bus means on selected ones of said tanks, said work carrier unit having an electrical contact means engageable with said bus means to supply electrical power to said motor for rotating said workpiece in said selected tanks.

11. The apparatus of claim 10 further comprising second electrical bus means on said crane, said electrical contact means engageable with said second bus means to supply electrical power to said motor for rotating said workpiece above said tanks.

12. The apparatus of claim 1 further comprising means for rotatably oscillating said workpiece about generally horizontal axes generally transverse to the direction of translation of said crane.

13. The apparatus of claim 1 wherein said work carrier unit further comprises a tank lid that covers the top of a tank when said workpiece is lowered into a tank.

14. The apparatus of claim 13 wherein at least one of said tanks is a heating station.

15. The apparatus of claim 13 wherein at least one of said tanks is a rinsing station, said rinsing station tank further comprising means for spraying a rinsing agent on said rotating workpiece.

16. The apparatus of claim 15 further comprising means for oscillating said spray means while spraying said rotating workpiece.

17. The apparatus of claim 1 further comprising means for rotating said workpiece above a tank to a selected angular orientation, and means for maintaining said workpiece in said selected angular orientation as said workpiece is lowered into said tank.

18. In a deposition system for applying a coating to workpieces such as, for example, car bodies, and where said system includes a plurality of sequentially disposed process tanks into which the workpieces are placed, apparatus for transporting said workpieces from one process tank to another, and for lowering and lifting said workpieces into and out of said tanks, said apparatus comprising:

(a) a superstructure over said tanks;

(b) at least one crane supported by said superstructure;

(c) first drive means for translating said crane along said superstructure;

(d) at least one work carrier unit having means for supporting at least one workpiece, said crane further comprising a carriage engageable with said work carrier unit;

(e) said selected ones of said tanks having means for supporting said work carrier unit and workpiece supported thereby;

(f) means for disengaging said carriage means from said work carrier unit whereby said crane is free from said work carrier unit when said work carrier unit is supported by a tank;

(g) second drive means for lowering and raising said carriage;

(h) third drive means carried by said work carrier unit for rotating said work piece supported thereby, said third drive means further comprising a motor and drive train;

(i) means for supplying power to said third drive means for rotating said workpiece in a selected tank; and (j) means for supplying power to said third drive means for rotating said workpiece above said selected tank;

(k) whereby the work carrier unit and workpiece are transported from one tank to another and lowered and lifted into and out of selected ones of said tanks, and said work carrier unit may be rotated in and above a selected tank.

19. The apparatus of claim 18 wherein said third drive means further comprises means for rotatably oscillating said workpiece in and above a selected tank.

20. The apparatus of claim 19 further comprising means for rotating said workpiece above a selected tank to a selected angular orientation, and means for maintaining said workpiece in said selected angular orientation as said workpiece is lowered into said tank.

21. The apparatus of claim 19 wherein said workpiece is oscillated about generally horizontal axes.

22. The apparatus of claim 19 wherein said workpiece is oscillated about generally horizontal axes generally transverse to the direction of translation of said crane.

23. The apparatus of claim 19 wherein said crane further comprises depending hoist masts, said hoist masts having means for supporting said carriage, and drive means for lowering and raising said carriage relative to said hoist masts, whereby said work carrier unit is engageable by said carriage to support said work carrier unit between said hoist masts when transported by said crane.

24. The apparatus of claim 23 wherein said work carrier unit further comprises a tank lid that covers the top of a tank when said workpiece is lowered into said tank.

25. The apparatus of claim 23 wherein said work carrier unit further comprises a platform for supporting said workpiece, said third drive means rotating said platform and workpiece as a unit.

* * * * *